(12) United States Patent
Zhou et al.

(10) Patent No.: US 11,498,989 B2
(45) Date of Patent: Nov. 15, 2022

(54) WATER-RESPONSIVE INTERPENETRATING POLYMER NETWORK, PREPARATION METHOD AND USE THEREOF

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangzhou (CN); Laurens De Haan, Guangzhou (CN); Zixuan Deng, Guangzhou (CN)

(73) Assignees: SOUTH CHINA NORMAL UNIVERSITY;, Guangzhou (CN); SHENZHEN GUOHUA OPTOELECTRONICS CO., LTD., Shenzhen (CN); ACADEMY OF SHENZHEN GUOHUA OPTOELECTRONICS, Shenzhen (CN)

(*) Notice: Subject to any disclaimer, the term of this patent is extended or adjusted under 35 U.S.C. 154(b) by 32 days.

(21) Appl. No.: 16/498,727

(22) PCT Filed: Dec. 28, 2018

(86) PCT No.: PCT/CN2018/124575
§ 371 (c)(1),
(2) Date: Sep. 27, 2019

(87) PCT Pub. No.: WO2020/107614
PCT Pub. Date: Jun. 4, 2020

(65) Prior Publication Data
US 2020/0339717 A1    Oct. 29, 2020

(30) Foreign Application Priority Data
Nov. 26, 2018 (CN) .......................... 201811418185.2

(51) Int. Cl.
*C08F 220/06* (2006.01)
*C08F 2/44* (2006.01)
(Continued)

(52) U.S. Cl.
CPC .............. *C08F 220/06* (2013.01); *C08F 2/44* (2013.01); *C08F 2/50* (2013.01); *C08F 220/34* (2013.01);
(Continued)

(58) Field of Classification Search
CPC ........ C08F 220/06; C08F 220/34; C08F 2/44; C09K 19/38; C09K 19/3833; C09K 19/3838
See application file for complete search history.

(56) References Cited

FOREIGN PATENT DOCUMENTS

| CN | 102349364 | 2/2012 |
|---|---|---|
| CN | 104793389 | 1/2018 |
| CN | 108339410 | 1/2021 |
| CN | 109593424 | 8/2021 |
| WO | 2018033595 | 2/2018 |
| WO | 2020107614 | 4/2020 |

OTHER PUBLICATIONS

Stumpel et al., "Stimuli-Responsive Materials Based on Interpenetrating Polymer Liquid Crystal Hydrogels", 2015, Advanced Functional Materials, 25, 3314-3320. (Year: 2015).*

(Continued)

*Primary Examiner* — Chanceity N Robinson
*Assistant Examiner* — Anna Malloy
(74) *Attorney, Agent, or Firm* — Gottlieb, Rackman & Reisman PC

(57) ABSTRACT

A water-responsive interpenetrating polymer network, a preparation method and use thereof are provided. The water-responsive interpenetrating polymer network comprises an interpenetrating polymer network formed by a cholesteric liquid crystal polymer and a polyionic liquid; wherein the cholesteric liquid crystal polymer is formed by polymerization of a liquid crystal mixture; and the polyionic liquid (Continued)

contains a hydrophilic group or is a hydrophilic salt. The interpenetrating polymer network is water responsive without needs of activation with an alkaline solution, which simplifies the preparation process, and has stable water responsiveness performance after prolonged and/or repeated exposure to water. The water-responsive interpenetrating polymer network can be used to prepare light reflective coatings and reflective devices, and has higher commercial value.

12 Claims, 2 Drawing Sheets

(51) Int. Cl.
 *C08F 2/50* (2006.01)
 *C08F 220/34* (2006.01)
 *C08F 230/02* (2006.01)
 *C09D 133/02* (2006.01)
 *C09D 133/14* (2006.01)
 *C09D 143/02* (2006.01)
 *C09K 19/38* (2006.01)
(52) U.S. Cl.
 CPC .......... *C08F 230/02* (2013.01); *C09D 133/02* (2013.01); *C09D 133/14* (2013.01); *C09D 143/02* (2013.01); *C09K 19/3852* (2013.01); *C09K 2219/03* (2013.01)

(56) References Cited

OTHER PUBLICATIONS

Jimenez et al., "Photopolymerization Kinetics of Ionic Liquid Monomers Derived from the Neutralization Reaction Between Trialkylamines and Acid-Containing (Meth)Acrylates", 2007, Journal of Polymer Science: Part A, vol. 45, 3009-3021. (Year: 2007).*
Jimenez et al., "Properties of Difunctional Ionic Liquid Monomers and Their Polymers", 2006, RadTech Technical Proceedings, https://radtech.org/proceedings/2006/papers/070.pdf, 1-5. (Year: 2006).*
Green et al., "The Design of Polymeric Ionic Liquids for the Preparation of Functional Materials", 2009, Journal of Macromolecular Science, 49, 339-360. (Year: 2009).*
Becht, et al., "Formation of a liquid-crystalline interpenetrating poly-(ionic+liquid) network hydrogel", Macromolecules 2011, 44, 1421-1428.
Stumpel, et al., "Stimuli-Responsive Materials Based on Interpenetrating Polymer Liquid Crystal Hydrogels", Adv. Funct. Mater., 2015, 25, 3314-3320.
Moirangthem, et al., "Full Color Camouflage in a Printable Photonic Blue-Colored Polymer", ACS Appl. Mater. Interfaces 2018, 10, 4168-4172.
Written Opinion for PCTCN 2018-124575 dated Jul. 2, 2019.
Notification to Grant of Corresponding Application CN 2018 11418185.
First Office Action for Corresponding Application CN 2018 11418185.
Second Office Action for Corresponding Application CN 2018 11418185.

* cited by examiner

WATER-RESPONSIVE INTERPENETRATING POLYMER NETWORK, PREPARATION METHOD AND USE THEREOF

CROSS-REFERENCE TO RELATED APPLICATIONS

This application is the United States National Stage entry under 35 U.S.C. 371 of PCT/CN2018/124575 filed on Dec. 28, 2018, which in turn claims the priority of Chinese patent application No. 201811418185.2 "WATER-RESPONSIVE INTERPENETRATING POLYMER NETWORK, PREPARATION METHOD AND USE THEREOF" filed on Nov. 26, 2018, both of which are hereby incorporated by reference in their entirety.

TECHNICAL FIELD

The present disclosure relates to a water-responsive material, and more particularly to a water-responsive interpenetrating polymer network.

BACKGROUND

The materials commonly used in liquid crystal displays are generally composed of rod-shaped molecules. These molecules point to the same direction. This feature allows these materials to have an ordered phase and still flow like a liquid. Cholesteric liquid crystals are of great importance to the preparation of various photon systems. When a nematic material/mixture is partially or wholly composed of molecules having a chiral center, a cholesteric phase is formed. In this phase, due to the continuous rotation of the director, the molecules form a helical structure. This phase has the special property of reflecting light of a certain wavelength band based on the distance of one complete director rotation (ie, pitch). When the polarization handedness of light is the same as the handedness of the pitch structure of the cholesteric phase, reflection occurs. The type and number of chiral molecules in the cholesteric phase material determine the pitch and the reflection wavelength. A larger number of chiral molecules may result in shorter pitch and shorter reflection wavelength. This property can be used to adjust the wavelength of light to be reflected by the material.

For some cholesteric materials, external stimuli can change the pitch and thus change the wavelength of reflected light. With this property, these materials can be used in applications such as thermometers, mood rings, intelligent infrared reflectors, water-responsive color patterns, sensors, imaging and anti-counterfeiting measures. A water-responsive cholesteric material is a special type of cholesteric liquid crystal system. It usually contains some hydrophilic groups, which can interact with water molecules to allow the material to swell, increase the pitch of the cholesteric phase, and thus increase the reflection wavelength. The material can return to its original state when it is dried again. The reaction with water molecules is usually reversible. Generally, water-responsive cholesteric materials contain carboxyl groups as hydrophilic groups. The strong hydrogen bonds between the carboxyl groups can facilitate hydrogen bonding with water. However, these groups are not initially water-responsive. In order to make these materials water-responsive, they need to be activated by solution with a high pH, for example, an aqueous solution of sodium hydroxide (NaOH) or potassium hydroxide (KOH). This will convert the carboxylic acid group into a hygroscopic carboxylate (when NaOH or KOH is used, respectively, corresponding sodium carboxylate or potassium carboxylate is obtained respectively), which will not form hydrogen bond any longer but is able to have an ionic interaction with water molecules. Such materials capable of interacting with water molecules have great potential commercial value, for example, Moirangthem et al. developed a printable blue CLC polymer coating, and the coating is patterned by ink jet printing of $Ca(NO_3)_2$ solution, and stronger ion-bonded calcium ions are used to replace potassium ions to inhibit water swelling. The final product shows full color camouflage when exposed to water or simply by exhaling.

An interpenetrating polymer network is a polymer blend composed of two or more polymer networks that are each cross-linked and interpenetrated. As a method for obtaining water responsiveness in a liquid crystal network having no built-in hygroscopic groups, a water-responsive film may be formed by establishing an interpenetrating polymer network (IPN), for example, an interpenetrating polymer network formed by combining cholesteric liquid crystal and poly (acrylic acid), which is obtained by polymerizing cholesteric mixtures of polymerizable liquid crystal and non-polymerizable liquid crystal, then removing the non-polymerizable compound by heating, wherein the non-polymerizable liquid crystal is called pore-forming agent, and then infiltrating the acrylic acid into the film using the free space generated by removing the non-polymerizable compound, locking the acrylic acid by a second polymerization, thus an interpenetrating network is obtained. All water-responsive cholesteric systems based on carboxylic acid groups require activation with an alkaline solution to destroy the hydrogen bonds and make the material hygroscopic to induce water responsiveness. In addition, the water-responsiveness stability of this alkali-activated carboxyl-based water-responsive cholesteric polymer reflector is not ideal, because the reactive cations easily escape from the network when immersed in water, and therefore, the activation process will be reversed rapidly, resulting in loss of responsiveness, and thus making these devices have a shorter life, which is unable to be applied to commercial products and only has the value for one-time laboratory demonstration.

SUMMARY

In light of the deficiencies of the existing art, the technical problem to be solved by the present disclosure is to provide a water-responsive interpenetrating polymer network and a preparation method, a light reflective coating and a reflection device. The water-responsive interpenetrating polymer network needs no alkali activation process and its water responsiveness will not lose when used for a long time, presenting a higher commercial value.

The present disclosure employs the following technical solutions:

The present disclosure provides a water-responsive interpenetrating polymer network, comprising an interpenetrating polymer network formed by a cholesteric liquid crystal polymer and a polyionic liquid; wherein the cholesteric liquid crystal polymer is formed by polymerization of a liquid crystal mixture; and the polyionic liquid contains a hydrophilic group or is a hydrophilic salt.

Preferably, the hydrophilic group comprises at least one of a hydroxyl group, an amide group, a carboxyl group, and a pyrrolyl group; and the hydrophilic salt is preferably a salt of carboxylic acid, ammonium, sulfonic acid, imidazolium or pyridinium.

Preferably, the polyionic liquid is formed by polymerization of a polymerizable salt. The polymerizable salt may be generated by the reaction of an ionic liquid monomer I and an ionic liquid monomer II, in which the ionic liquid monomer I may be:

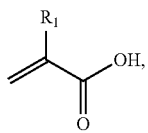

and the ionic liquid monomer II may be:

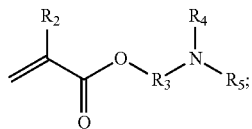

wherein, $R_1$, $R_2$ are each independently selected from the group consisting of hydrogen, a C1 to C10 alkyl group, a halogen group, and a C1 to C10 alkoxyl group, $R_3$ is selected from a C1 to C10 alkylene group, $R_4$, $R_5$ are each independently selected from C1 to C10 alkyl group. The halogen group comprises Cl, Br, and the like.

More preferably, $R_1$ is selected from hydrogen or methyl, $R_2$ is selected from hydrogen or methyl, $R_3$ is selected from C1-C6 alkylene, $R_4$, $R_5$ are each independently selected from one of hydrogen, methyl and ethyl.

The reaction process of generating a polymerizable salt by the ionic liquid monomer I and ionic liquid monomer II is shown as follows:

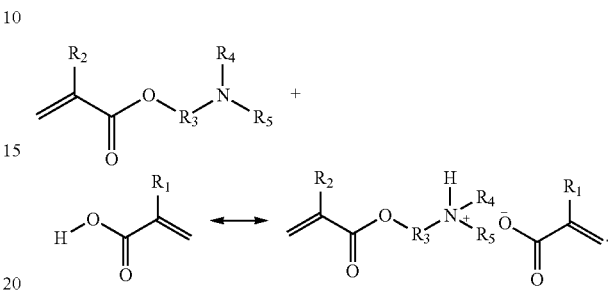

Ionic liquid monomer I is an unsaturated carboxylic acid derivative in which a carboxyl group may be bound with an ionic liquid monomer II to form a carboxylate. As a molecule used to form the polymerizable salt, preferred compounds according to the present disclosure are shown in Table 1:

TABLE 1

Preferred compounds for the formation of a polymerizable salt

Preferably, the liquid crystal mixture comprises a polymerizable liquid crystal monomer, a chiral dopant and a photoinitiator; wherein, the polymerizable liquid crystal monomer may wholly or partially be a chiral liquid crystal monomer in order to polymerize the liquid crystal mixture to form a cholesteric liquid crystal polymer.

More preferably, the liquid crystal mixture further comprises a surfactant to improve the arrangement of molecules.

The present disclosure further provides a method of preparing the water-responsive interpenetrating polymer network, comprising the following steps:

S1: mixing a liquid crystal mixture and a pore-forming agent, performing polymerization, and then removing the pore-forming agent;

S2: adding ionic liquid monomers, and performing polymerization again to form an interpenetrating polymer network.

The selected pore-forming agent of the present disclosure is not involved in the reaction when the liquid crystal mixture is polymerized to form a cholesteric polymer, and can be removed by heat evaporation or wash with a solvent. Preferably, the pore-forming agent is a non-photopolymerizable liquid crystal monomer.

Preferred compounds of liquid crystal monomer and pore-forming agent are as shown in Table 2 and Table 3.

TABLE 3

Preferred compound of pore-forming agent

Pore-forming agent

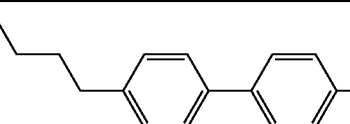

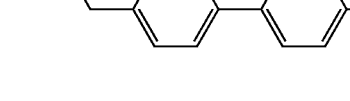

TABLE 2

Preferred compound of liquid crystal monomer

Liquid crystal monomer

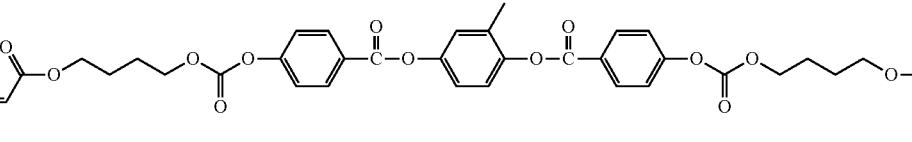

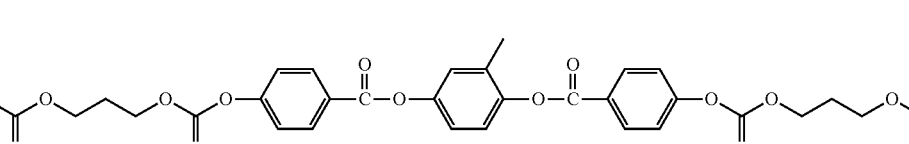

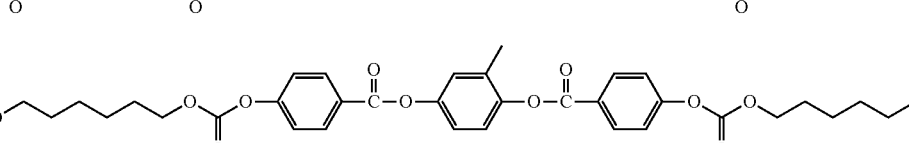

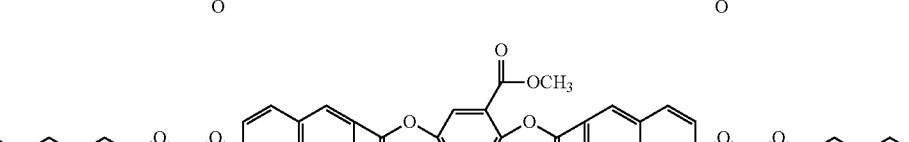

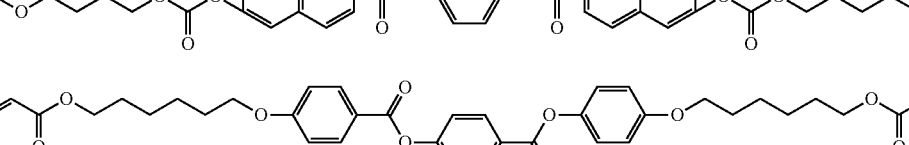

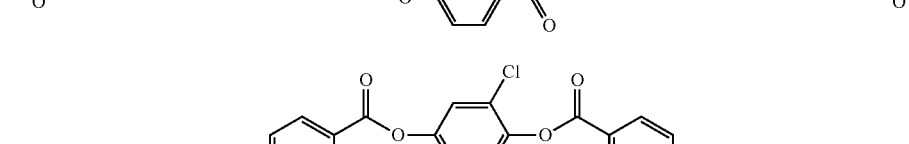

TABLE 3-continued

Preferred compound of pore-forming agent

Pore-forming agent

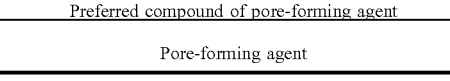

According to the preparation method of the present disclosure, a water-responsive interpenetrating polymer network is preferably prepared on a substrate. Specifically, the liquid crystal mixture and the pore-forming agent are mixed and then coated onto the substrate, and the adopted substrate may be a rigid substrate such as glass, or a soft substrate such as a plastic film. The coating process may be selected from one of knife coating, bar coating, spin coating, ink jet printing and spray coating. The substrate may have an alignment layer to improve the arrangement of the molecules, although it is not always necessary as arrangement of the molecules may also be caused by the shearing force in many cases during the coating process. After coating, irradiation with ultraviolet light activates the photoinitiator and initiates polymerization of the liquid crystal monomers. At this time, a solid film is obtained in which a pore-forming agent is still present. The pore-forming agent is removed by heat evaporation or wash with a solvent, to obtain a cholesteric polymer having a free space. Then the polymerizable salt is filled in the free space, and after a second polymerization, an interpenetrating polymer network is formed.

Uses of the above water-responsive interpenetrating polymer network are provided in intelligent infrared reflectors, water-responsive color patterns, sensors, imaging and anti-counterfeiting measures.

The present disclosure further provides a light reflective coating comprising the water-responsive interpenetrating polymer network described above.

The present disclosure further provides a reflective device comprising the water-responsive light reflective coating described above.

The beneficial effects of the present disclosure are presented as follows:

The present disclosure provides a water-responsive interpenetrating polymer network formed by interpenetrating cholesteric liquid crystal polymer and polyionic liquid. Polyionic liquid is used to replace the conventional poly- acrylic acid as a second polymer. The polyionic liquid formed by polymerization of ionic liquid monomers is hygroscopic due to the presence of hydrophilic group or being a hydrophilic salt, which enables the interpenetrating polymer network to absorb water and swell, increasing the length of the pitch of the cholesteric polymer in the interpenetrating polymer network, which in turn leading to an increase in the reflection wavelength of the interpenetrating polymer network material, thus presenting water responsiveness. The water-responsive interpenetrating polymer network of the present disclosure simplifies the preparation process without the needs of activation with alkaline solution. In addition, since both positive ions and negative ions are part of the polyionic liquid, when trapped in the interpenetrating polymer network, no ions can escape from the network, which will not lead to lose of the water responsiveness of the material and instead result in stable response performance after prolonged and/or repeated exposure to water. The water-responsive interpenetrating polymer network of the present disclosure can be used to prepare light reflective coatings and reflective devices, presenting higher commercial values.

DETAILED DESCRIPTION

Figure 1:
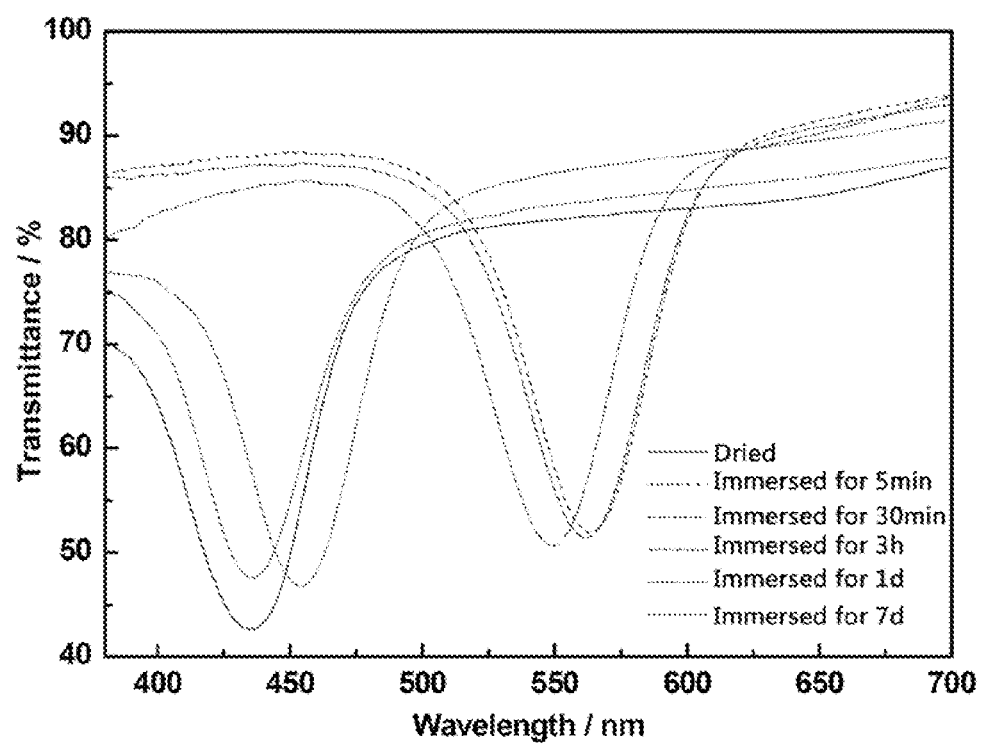
FIG. 1 is a test result diagram of the water responsiveness stability of an interpenetrating polymer network in the Comparative Example 1.

The concept and the resulting technical effects of the present disclosure will be clearly and sufficiently described in conjunction with the examples below in order to facilitate fully understanding the objectives, technical features and effects of the present disclosure. Apparently, examples or embodiments described herein are only some of rather than all of the examples or embodiments of the present disclosure, and those examples or embodiments which may be obtained by those skilled in the art without creative work based on the examples or embodiments herein are intended to be included in the scope of protection of the present disclosure.

In the following examples, the nematic liquid crystal monomer HCM-002 was purchased from Jiangsu Hecheng New Material Co., Ltd., with the structure:

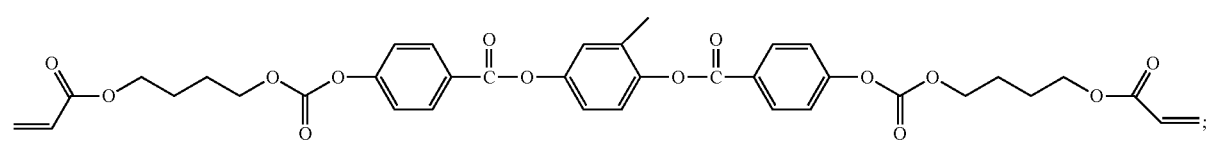 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

the chiral dopant HCM-006 was purchased from Jiangsu Hecheng New Material Co., Ltd., with the structure:

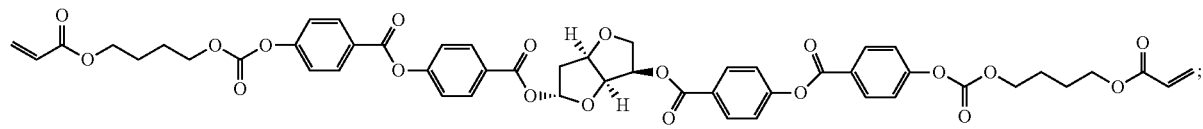 [SMILES: C=CC(=O)OCCCCOC(=O)Oc1ccc(C(=O)Oc2ccc(C(=O)O[C@@H]3C[C@H]4OC[C@@H](OC(=O)c5ccc(OC(=O)c6ccc(OC(=O)OCCCCOC(=O)C=C)cc6)cc5)[C@H]4O3)cc2)cc1]

the non-polymerizable liquid crystal unit 5CB was purchased from Jiangsu Creative Electronic Chemmicals with the structure:

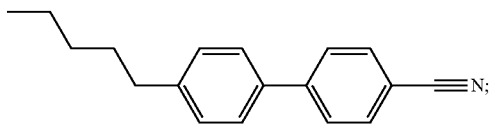

the structure of the photoinitiator was:

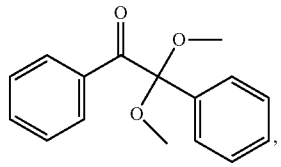 [SMILES: COC(OC)(C(=O)c1ccccc1)c1ccccc1]

and the structure of the surfactant was:

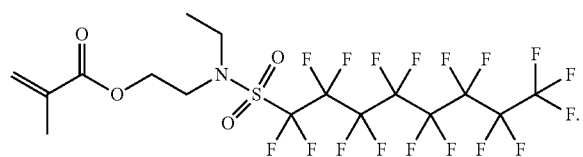 [SMILES: C=C(C)C(=O)OCCN(CC)S(=O)(=O)C(F)(F)C(F)(F)C(F)(F)C(F)(F)C(F)(F)C(F)(F)C(F)(F)C(F)(F)F]

EXAMPLE 1

A mixture was obtained by mixing 48.6 parts by mass of nematic liquid crystal monomer HCM-002, 6.8 parts by mass of chiral dopant HCM-006, 2 parts by mass of photoinitiator, 2 parts by mass of surfactant, and 40.6 parts by mass of non-polymerizable liquid crystal unit 5CB. The mixture was coated onto a methacrylate-functionalized glass substrate using knife coating, and the molecules was oriented by shear force. After coating, ultraviolet irradiation was conducted immediately, and the oriented coating was photopolymerized under a nitrogen atmosphere, wherein the non-polymerizable liquid crystal unit 5CB was present as a pore-forming agent. Then 5 CB was removed by heating at 140° C. for 10 min to obtain a cholesteric polymer coating.

Equimolar of acrylic acid and 2-(dimethylamino) ethyl methacrylate were taken to carry out the neutralization reaction to produce a polymerizable salt, the specific formation process was:

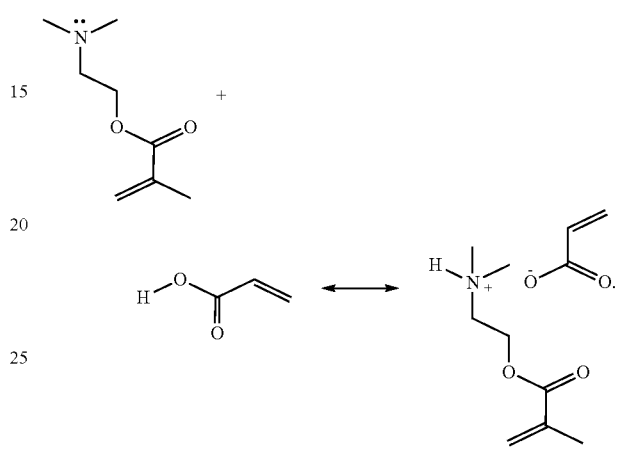

The polymerizable salt generated from the reaction was placed on the above cholesteric polymer coating, immediately covered with a clean glass plate, heated to allow better and faster penetration of the polymerizable salt, and then a second UV irradiation was performed to polymerize the polymerizable salt to form a polyionic liquid and then form an interpenetrating polymer network with the cholesteric polymer.

The polymerizable salt used for the formation of the polyionic liquid in this example was a carboxylate generated by the reaction of acrylic acid and 2-(dimethylamino)ethyl methacrylate. In the present disclosure, the polyionic liquid comprised, but was not limited to, a carboxylic acid based ionic liquid, a sulfonic acid based ionic liquid such as 4-vinylbenzenesulfonic acid-tetrabutyl quaternary phosphonium salt polymer (PTPSS), an amide based ionic liquid such as N-isopropyl acrylamide polymer (PNIPAM) and the like. Since the polyionic liquid had a hydrophilic group or was a hydrophilic salt, it was hygroscopic, which enabled the interpenetrating polymer network to absorb water and swell, increasing the length of the pitch of the cholesteric polymer in the interpenetrating polymer network, which in turn lead to an increase in the reflection wavelength of the interpenetrating polymer network material. Thus, water responsiveness was exhibited; meanwhile, since both positive and negative ions are part of the polyionic liquid, when they were trapped in the interpenetrating polymer network, no ions can escape from the network, thus there was no loss of the water responsiveness of the material.

COMPARATIVE EXAMPLE 1

Comparative Example 1 provided a cholesteric interpenetrating polymer network, and its preparation process was the same as that of Example 1, except that acrylic acid was used in place of the polymerizable salt in Example 1 and formed an interpenetrating polymer network with cholesteric polymer, and KOH was used for activation.

EXAMPLE 2

Figure 2:
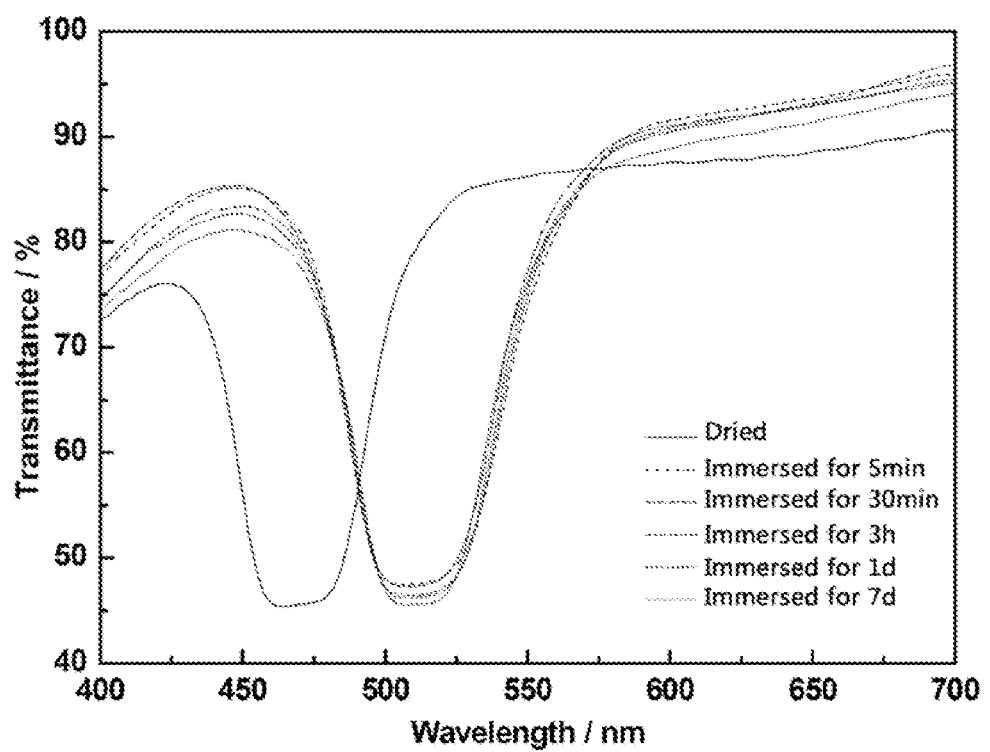
FIG. 2 is a test result diagram of the water responsiveness stability of an interpenetrating polymer network in Example 1.

The interpenetrating polymer networks in Example 1 and Comparative Example 1 were tested for water responsiveness stability. The specific process was conducted as follows: both interpenetrating polymer networks were immersed in deionized water, and UV-Vis/IR spectroscopy was used to determine the reflection bands of both interpenetrating polymer networks in wet state after immersion for different periods of time. Results were shown in FIG. 1 and FIG. 2, in which FIG. 1 showed results of Comparative Example 1 and FIG. 2 showed results of Example 1. As shown in FIG. 1, for the activated polyacrylic acid interpenetrating polymer network in Comparative Example 1, the reflection bands had blue shifts as the immersion time increased. The reflection bands at 563 nm when immersed for 5 minutes continued to have blue shift as the immersion time extended, and arrived at the position of 436 nm when immersed for up to 7 days, which is basically the same as the position of the reflection band when dried, indicating that the positive ions continued to escape from the network and water responsiveness was disappearing gradually as the immersion time extended. It can be seen from FIG. 2 that, for the interpenetrating polymer network formed by the polyionic liquid and the cholesteric liquid crystal polymer in Example 1, the measured positions of the reflection band maintained substantially the same value as the immersion time increaseed, which was approximately at the position of 513 nm. The reflection band curves measured after immersion for 5 min and immersion for 30 min were basically the same, and the reflection band curves measured after immersion for 3 h and 1 d were basically the same, suggesting that the water responsiveness performance of the interpenetrating polymer network of the present disclosure was quite stable. Therefore, it can be concluded that, compared to conventional interpenetrating polymer networks formed from polyacrylic acid, the interpenetrating polymer network of the present disclosure was more stable in responsiveness performance after prolonged and/or repeated exposure to water.

EXAMPLE 3

The mixture was obtained by mixing 48.6 parts by mass of nematic liquid crystal monomer HCM-002, 6.8 parts by mass of chiral dopant HCM-006, 2 parts by mass of photoinitiator, 2 parts by mass of surfactant, and 40.6 parts by mass of non-polymerizable liquid crystal unit 5CB. The mixture was coated onto a methacrylate-functionalized glass substrate using knife coating, and the molecules were oriented by shear force. After coating, ultraviolet irradiation was conducted immediately, and the oriented coating was photopolymerized under a nitrogen atmosphere, wherein the non-polymerizable liquid crystal unit 5CB was present as a pore-forming agent, and then heated at 140° C. for 10 min to remove 5CB to obtain a cholesteric polymer coating.

Equimolar of 4-vinylbenzenesulfonic acid and tetrabutylphosphonium bromide were taken and reacted to produce a polymerizable salt, which gave a polymer of 4-vinylbenzenesulfonic acid-tetrabutyl quaternary phosphonium salt having the structural formula:

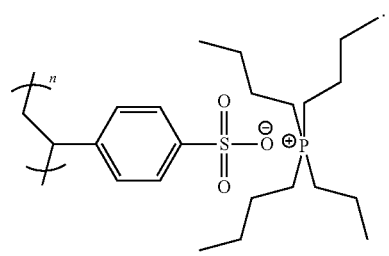

The polymerizable salt generated from the reaction was placed on the above cholesteric polymer coating, immediately covered with a clean glass plate, heated to allow better and faster penetration of the polymerizable salt; and then a second UV irradiation was performed to polymerize the polymerizable salt to form a polyionic liquid and then form an interpenetrating polymer network with the cholesteric polymer. The resulted interpenetrating polymer network was tested and determined to have stable water responsiveness.

What is claimed is:

1. A water-responsive interpenetrating polymer network, comprising a cholesteric liquid crystal polymer and a polyionic liquid; wherein the cholesteric liquid crystal polymer is a polymerized liquid crystal mixture; and the polyionic liquid is a hydrophilic salt;
   wherein the polyionic liquid is derived from the following polymerizable salt:

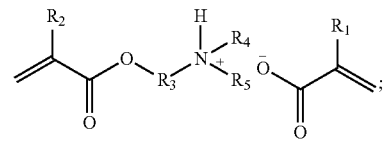

wherein, $R_1$, $R_2$ are each independently selected from the group consisting of hydrogen, a C1 to C10 alkyl group, a halogen group, and a C1 to C10 alkoxyl group, $R_3$ is selected from a C1 to C10 alkylene group, $R_4$, $R_5$ are independently selected from the group consisting of hydrogen, and C1 to C10 alkyl group.

2. The water-responsive interpenetrating polymer network according to claim 1, wherein $R_1$ is selected from hydrogen or methyl, $R_2$ is selected from hydrogen or methyl, $R_3$ is selected from C1 to C6 alkylene, $R_4$, $R_5$ are each independently selected from one of hydrogen, methyl and ethyl.

3. The water-responsive interpenetrating polymer network according to claim 1, wherein the polymerized liquid crystal mixture is derived from polymerizable liquid crystal monomers, a chiral dopant and a photoinitiator.

4. The water-responsive interpenetrating polymer network according to claim 3, wherein the polymerized liquid crystal mixture further comprises a surfactant.

5. A method of preparing the water-responsive interpenetrating polymer network comprising the steps of:
   mixing a polymerizable cholesteric liquid crystal mixture and a pore-forming agent, performing polymerization, and then removing the pore-forming agent; and
   adding a polymerizable salt, and performing polymerization again, wherein the polymerizable salt is as follows:

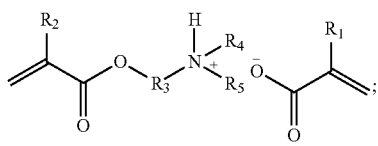

wherein, $R_1$, $R_2$ are each independently selected from the group consisting of hydrogen, a C1 to C10 alkyl group, a halogen group, and a C1 to C10 alkoxyl group, $R_3$ is selected from a C1 to C10 alkylene group, $R_4$, $R_5$ are independently selected from the group consisting of hydrogen, and C1 to C10 alkyl group.

6. The method of preparing the water-responsive interpenetrating polymer network according to claim 5, wherein the pore-forming agent is a non-photopolymerizable liquid crystal monomer.

7. The method of preparing the water-responsive interpenetrating polymer network according to claim 5, wherein after the polymerizable cholesteric liquid crystal mixture and the pore-forming agent are mixed, they are coated onto a substrate prior to polymerization.

8. The method of preparing the water-responsive interpenetrating polymer network according to claim 7, wherein the pore-forming agent is removed by heating evaporation or washing with a solvent.

9. The method of preparing the water-responsive interpenetrating polymer network according to claim 7, wherein the substrate is coated with an alignment layer.

10. A method of using the water-responsive interpenetrating polymer network according to claim 1, comprising the step of applying the water-responsive interpenetrating polymer network in intelligent infrared reflectors, water-responsive color patterns, sensors, imaging and anti-counterfeiting measures.

11. A light reflective coating, comprising the water-responsive interpenetrating polymer network of claim 1.

12. A reflective device, comprising the water-responsive light reflective coating of claim 11.

* * * * *